US 6,599,656 B2

(12) United States Patent
Cittanova

(10) Patent No.: US 6,599,656 B2
(45) Date of Patent: Jul. 29, 2003

(54) STORAGE CELL BATTERY INCORPORATING A SAFETY DEVICE

(75) Inventor: Jean-Pierre Cittanova, Bousquet (FR)

(73) Assignee: Alcatel, Paris (FR)

(*) Notice: Subject to any disclaimer, the term of this patent is extended or adjusted under 35 U.S.C. 154(b) by 232 days.

(21) Appl. No.: 09/884,070

(22) Filed: Jun. 20, 2001

(65) Prior Publication Data

US 2001/0055712 A1 Dec. 27, 2001

(30) Foreign Application Priority Data

Jun. 26, 2000 (FR) .......................... 00 08 153

(51) Int. Cl.[7] .................... H01M 2/00; H01M 2/12
(52) U.S. Cl. ................. 429/61; 429/62; 429/116; 429/110; 429/112; 429/56; 429/90; 429/122
(58) Field of Search ................... 429/61, 62, 116, 429/110, 112, 56, 90, 122

(56) References Cited

U.S. PATENT DOCUMENTS 4,061,842 A * 12/1977 Evans .................. 429/116
4,820,598 A    4/1989 Descroix et al.
6,447,946 B1 * 9/2002 Nakai et al. ............ 429/213

FOREIGN PATENT DOCUMENTS

| FR | 1 267 255     | 11/1961 |
| FR | 2 536 712     | 6/1984  |
| FR | 2 704 981 A1  | 11/1994 |
| JP | 5-317440      | 12/1993 |
| JP | 11 169475     | 6/1999  |
| JP | 11 219732     | 8/1999  |

OTHER PUBLICATIONS

Patent Abstracts of Japan, vol. 016, No. 505, Oct. 19, 1992 corresponding to JP 4 188570 A (Yuasa Battery Co Ltd) dated Jul. 7, 1992.
Patent Abstracts of Japan, vol. 1998, No. 09, dated Jul. 31, 1998 corresponding to JP 10 0855356 dated Apr. 7, 1998.
Patent Abstracts of Japan, vol. 015, No. 302 Aug. 2, 1991 corresponding to JP 03 112570 A dated May 1991.

* cited by examiner

Primary Examiner—Patrick Ryan
Assistant Examiner—Angela J Martin
(74) Attorney, Agent, or Firm—Sughrue Mion, PLLC

(57) ABSTRACT

A storage cell battery includes at least one cell having an enclosure containing an electrode assembly impregnated with an electrolyte and including at least one positive electrode, at least one negative electrode and at least one separator disposed between the electrodes. The cells are housed in a common container provided with a first orifice. A safety device includes an anomaly detector, a storage tank containing a non-inflammable gas under pressure and connected to the first orifice, and a control system in the form of a pyrotechnic mechanism for controlling the admission of the gas into the common container.

8 Claims, 1 Drawing Sheet

STORAGE CELL BATTERY INCORPORATING A SAFETY DEVICE

CROSS-REFERENCE TO RELATED APPLICATIONS

This application is based on French Patent Application No. 00 08 153 filed Jun. 26, 2000, the disclosure of which is hereby incorporated by reference thereto in its entirety, and the priority of which is hereby claimed under 35 U.S.C. §119.

BACKGROUND OF THE INVENTION

1. Field of the Invention

The present invention relates to a storage cell battery incorporating a safety device. The device operates in the event of an anomaly in the operation of one or more cells to increase the response time and minimize the risks, in particular of fire. This is why the invention is more particularly intended to be applied to lithium rechargeable storage cell batteries, some components of which are inflammable. Improving the safety of the user is one imperative for "consumer" applications, for example if the battery is installed in an electric vehicle.

2. Description of the Prior Art

Storage cells have an enclosure containing an electrode assembly impregnated with electrolyte and made up of at least one positive electrode, at least one negative electrode, and at least one separator disposed between the electrodes. The cells can be combined to form a battery by series or parallel connections. They are placed together in a closed container. An anomaly in the operation of the battery can be caused by the malfunctioning of one of the cells (short circuit, etc) or an external disturbance (impact, temperature rise, etc). The anomaly causes the battery to become heated and increases the risk of fire. The proximity of a large number of cells multiplies the risk accordingly, which makes external intervention necessary for permanently safeguarding the battery. The risk is particularly high in the case of lithium cells, which in particular contain organic solvents that are readily volatile at relatively low temperatures in the range from 70° C. to 120° C., with flash points in the range of ambient temperature up to 100–200° C.

Safety devices have been proposed whose object is to extinguish a fire using an extinguishing agent that can take the form of a gas, a liquid, a powder, granules or a mixture of the above.

The device can be installed inside the cell itself, as described in the documents JP-9 161 754 and U.S. Pat. No. 5,523,178. This has the drawback of increasing the total volume of the battery in proportion to the number of cells constituting it. The energy per unit volume of this kind of battery falls, and soon becomes incompatible with user expectations. In other cases (JP-03 112 570), an extinguishing agent stored externally is introduced directly into the interior of each cell, which requires an injection conduit specific to each cell. Once again, the resulting overall size is prohibitive for a consumer application, for example in an electric vehicle, where the space available for the battery is very constricted.

In the particular case of sodium-sulfur (Na—S) cell batteries, which operate at high temperatures (300° C.–400° C.), several documents (JP-4 288 169, JP-4 300 563, JP-4 303 466 and JP-5 031 207) describe fire-fighting equipment that injects a granulated extinguishing agent into the container of a battery via an injection nozzle (JP-4 288 169 or JP-5 031 207) or preferably via a distribution manifold so that the agent is distributed homogeneously (JP-4 300 563 or JP-4 303 466). Injection is commanded by a fire detector, such as a temperature probe, placed on the container. The fire-fighting equipment is disposed outside the battery. It includes in particular a storage tank containing the extinguishing agent granules and an inert gas and a device for pressurizing the gas contained in the storage tank. The storage tank and the device are connected to each other and to the container by pipes and valves.

It takes a long time for the fire-fighting equipment to respond, in particular because this entails a time-delay to pressurize the storage tank using a gas supply device. To reduce this time-delay, it has been proposed to keep the storage tank pressurized by connecting it to a pressurized cylinder (JP-5 084 318). However, pressurized gas leaks into the valves and the pipes and when fire breaks out there is insufficient gas to entrain the extinguishing agent. A compressor can be added to the equipment to remedy this drawback (JP-5 089 908). This improvement requires an additional component, and therefore increases the volume of the equipment, increases its cost and requires more complicated maintenance. Moreover, if the storage tank is pressurized, the powder and the granules of extinguishing agent can find their way into the seats of the valves and the connecting flanges, which increases leaks.

Also in the case of Na—S cells, the document JP-5 317 440 proposes fire-fighting equipment that does not include any auxiliary device for pressurizing the storage tank. The equipment includes a device for supplying pressurized gas to the extinguishing agent storage tank and a device for admitting pressurized gas to the battery container. If fire breaks out in the container, the gas is emitted simultaneously toward the container and toward the storage tank by an array of pipes and a set of automatic valves whose control circuit is connected to the fire detector. Once the pressure in the storage tank has reached the required value, the control device interrupts the emission of gas by the emission device. The extinguishing agent entrained by the gas from the supply device is then fed into the container.

The devices previously described have the drawback of reacting too slowly for the safety of the user. The outbreak of fire is detected by a temperature sensor which causes valves to be opened via a control circuit. The gas must then flow through the pipes before reaching the container. These successive operations necessitate time-delays that can be as much as several seconds.

In the case of a lithium rechargeable cell battery, in particular, because of the presence of very volatile organic solvents, this time period is sufficient to reach an unacceptable level of risk. In particular, this battery has a high risk of fire due to products generated by thermal runaway of the reaction.

An object of the present invention is to eliminate the drawbacks of the prior art and in particular to shorten the time-delay between detecting an anomaly and the removal from danger of a cell battery in order to enhance the safety of the user. The invention relates more precisely to a safety device, in particular a fire-fighting device, solving this problem.

SUMMARY OF THE INVENTION

The present invention provides a storage cell battery including:

at least one cell having an enclosure containing an electrode assembly impregnated with an electrolyte and comprising at least one positive electrode, at least one negative electrode and at least one separator disposed between the electrodes, a common container provided with a first orifice, and a safety device including an anomaly detector, a storage tank containing a non-inflammable gas under pressure and connected to the first orifice, and a control system in the form of a pyrotechnic mechanism for controlling the admission of the gas into the common container.

The function of the safety device according to the invention is to prevent the onset or to stop the evolution of a fire affecting the cells and which is likely to propagate. The combination of a pyrotechnic mechanism with a very short response time and a non-inflammable gas injected at high speed into the container because of the pressure fills the common container virtually immediately and improves the efficiency of flame inhibition. With the danger averted in this way, the user can act himself or call on external help.

The anomaly detector includes a system for measuring the value of the parameter to be detected and a system for comparing the measured value to a reference value. The measuring system can be a temperature sensor, for example, a pressure sensor or a shock detector. The comparator system can be a probe for measuring the outdoor temperature or a sensor for measuring the outside pressure.

On detecting a value, for example a temperature value, greater than the fixed reference value, the pyrotechnic mechanism is fired. The mechanism includes a pyrotechnic composition and an initiator which can be electrical, mechanical or magnetic. An electrical initiator is preferably used, with a locally heated filament that causes very energetic combustion of a powder composition. Its operating time-delay is of the order of a few milliseconds.

A first variant of the mechanism includes an explosive composition whose detonation opens a vent mechanically. The vent is inserted into the wall of the inert gas storage tank at an element for communication with the container, for example.

In a second variant, the mechanism contains a composition whose combustion generates gases producing a pressure sufficient to actuate a piston. The pressure increase is sufficient to push the piston and the movement of the piston frees the passage leading to the container for the inert gas coming from the storage tank.

The inert gas storage tank contains carbon dioxide $CO_2$ or argonite (equi-volume mixture of nitrogen $N_2$ and argon Ar). It is a pressurized cylinder, for example. Argonite is preferred in the case of use in an electric vehicle. $CO_2$ must be stored in the liquid state and the storage pressure varies with temperature. Storage requires a pressure of almost 200 bars, given the temperature under the hood of a vehicle (50–60° C.), compared to only 52 bars at room temperature (20° C.).

In one embodiment, the container is further provided with a second orifice. This is the case in particular if the battery is cooled by sweeping air through the container, the additional orifice being an air intake.

The battery according to the invention can equally be provided with some other type of cooling device, for example one circulating a fluid in a double wall of the cell enclosure.

In a preferred embodiment, at least one of the orifices contains a check valve, preferably a low-pressure check valve. Air is expelled from the container at a high flowrate by the sudden introduction of the inert gas. The valve then closes again, possibly allowing a slight leak to prevent backflow of air.

The invention will be better understood and other advantages and features will become apparent on reading the following description of embodiments of the invention, which refers to the accompanying drawings.

DETAILED DESCRIPTION OF THE PREFERRED EMBODIMENTS

It must be understood that the drawings and the corresponding parts of the description are provided entirely to illustrate the subject matter of the invention, which they do not limit in any way.

Figure 1:
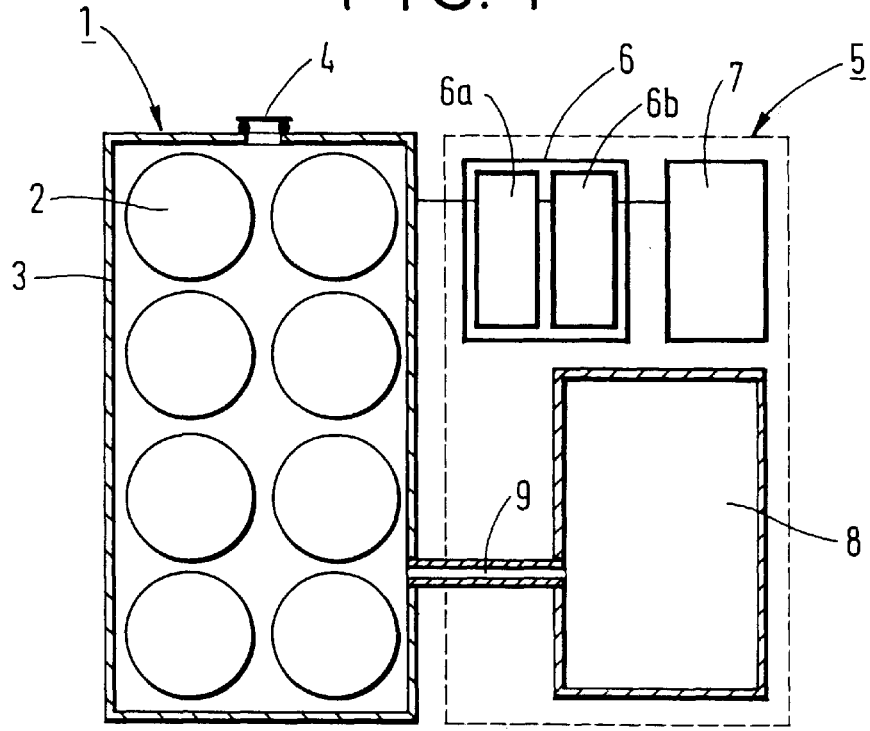
FIG. 1 is a diagram showing a battery according to the invention fitted with a safety device.

In a first embodiment of the present invention, shown in FIG. 1, the battery 1 includes eight cells 2, for example lithium cells, each having a cylindrical enclosure, and housed in a common container 3 closed by an orifice 4 fitted with a check valve. The check valve must be set to achieve a compromise between two objectives, namely fast evacuation of the air contained in the common container, requiring a relatively large diameter, and ongoing residual sweeping with a slight leak to prevent backflow of air.

The dead volume inside the battery container 3 is of the order of 500 $dm^3$. The battery 1 includes a safety device 5 to prevent fire. The safety device 5 includes a temperature detector 6 connected to a pyrotechnic mechanism 7 cooperating with a gas storage tank 8 that communicates with the container 3 via an introduction tube 9. The diameter of the tube 9 is sufficiently large for it not to impede the admission of the gas into the container 3 and the tube is as short as possible. The storage tank 8 contains argonite $Ar/N_2$ at a pressure of approximately 60 bars. The temperature detector 6 consists of a measuring probe 6a and a comparator 6b.

If heating occurs inside one of the cells 2, for example as a result of an internal short circuit, the temperature of the battery 1 rises. The probe 6a measures the temperature and the comparator 6b compares the measured value with a reference value, for example the temperature in the surrounding environment. If the measured value is greater than the reference value, the pyrotechnic mechanism 7 is triggered. The pyrotechnic mechanism contains a primary explosive composition and an igniter composition. The initiator is electrical. Firing takes about 2 ms. The explosion of the composition opens a vent on the path of the gas between the storage tank and the battery container. In total less than 10 ms is required to enable entry into the container 3 of pressurized gas from the storage tank 8.

The gas flowrate is of the order of 130 $dm^3/s$. The gas enters the container violently, expelling the air from it via the orifice 4. In this example 11 $dm^3$ of argonite at 60 bars (approximately 1 kg of gas) is necessary to expel all of the oxygen contained in the dead volume, and about 20% thereof will be used for sweeping. The storage tank is emptied in 5 s. Replacing the air with a non-inflammable gas in this way minimizes the risk of fire pending human intervention and allows human intervention.

Figure 2:
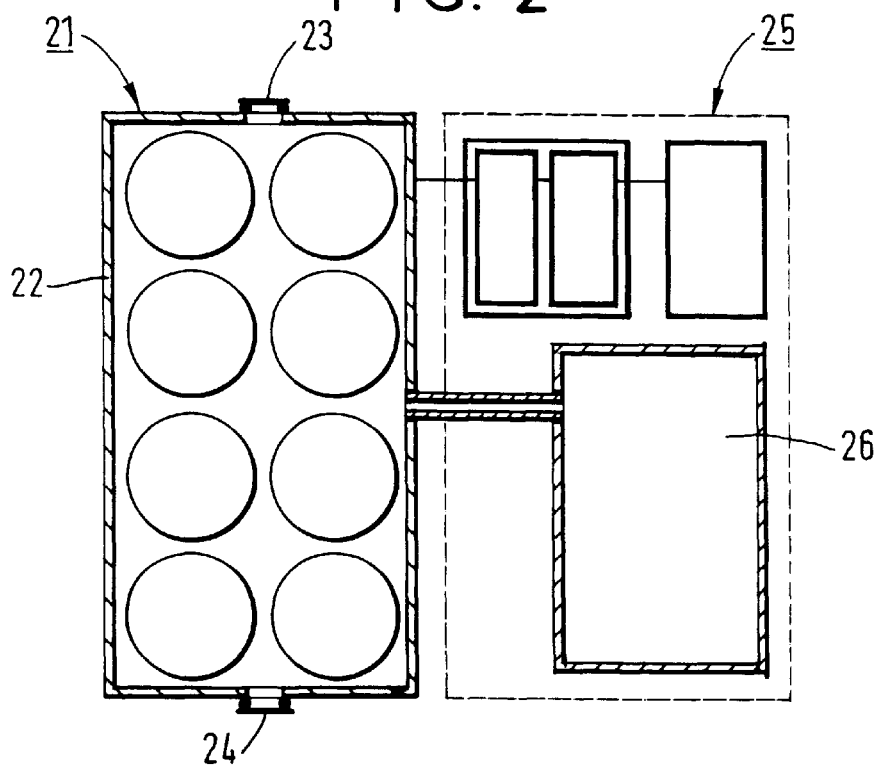
FIG. 2 is a diagram similar to that of FIG. 1 showing a different embodiment of a battery according to the invention.

FIG. 2 shows a different embodiment in which the battery 21 is cooled by a flow of air through the container. In this case an additional air intake orifice is provided on the container.

The battery 21 includes a container 22 with an air intake orifice 23 and an air outlet orifice 24, each orifice being fitted with a check valve. The battery 21 also includes a safety device 25 similar to that shown in FIG. 1 except that the storage tank 26 at room temperature (20° C.) contains $CO_2$ at a pressure of approximately 52 bars.

If the anomaly detector measures an abnormal value of a parameter, the circulation of cooling air is stopped. The pyrotechnic mechanism causes the inert gas to enter the container. The air expelled by the inert gas escapes to the outside via the orifices 23 and 24.

There is claimed:

1. A storage cell battery including:
   at least one cell having an enclosure containing an electrode assembly impregnated with electrolyte and comprising at least one positive electrode, at least one negative electrode and at least one separator disposed between the electrodes,
   a common container provided with a first orifice, and
   a safety device including an anomaly detector, a storage tank containing a non-inflammable gas under pressure and connected to said first orifice, and a control system in the form of a pyrotechnic mechanism for controlling the admission of said gas into said common container.

2. The battery claimed in claim 1 wherein said container is further provided with a second orifice.

3. The battery claimed in claim 1 wherein said orifice contains a check valve.

4. The battery claimed in claim 1 wherein said pyrotechnic mechanism includes an igniter composition and an initiator chosen from the group comprising an electric initiator, a mechanical initiator and a magnetic initiator.

5. The battery claimed in claim 4 wherein said mechanism contains an explosive composition whose detonation opens a vent mechanically.

6. The battery claimed in claim 4 wherein said mechanism contains a composition whose combustion generates gases producing a pressure sufficient to actuate a piston.

7. The battery claimed in claim 1 wherein said non-inflammable gas storage tank contains carbon dioxide or argonite.

8. The battery claimed in claim 1 wherein said anomaly detector includes a system for measuring the value of the parameter to be detected and a system for comparing the measured value to a reference value.

* * * * *